(12) United States Patent
Caldwell

(10) Patent No.: US 8,689,740 B2
(45) Date of Patent: *Apr. 8, 2014

(54) PET WASH TUB

(75) Inventor: Russell L. Caldwell, Garden Prairie, IL (US)

(73) Assignee: CCSI International, Inc., Garden Prairie, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/461,965

(22) Filed: May 2, 2012

(65) Prior Publication Data

US 2012/0279456 A1 Nov. 8, 2012

Related U.S. Application Data

(60) Provisional application No. 61/518,202, filed on May 2, 2011, provisional application No. 61/518,201, filed on May 2, 2011.

(51) Int. Cl.
*A01K 13/00* (2006.01)
*A61D 11/00* (2006.01)

(52) U.S. Cl.
USPC ............................ 119/675; 119/671; 119/673

(58) Field of Classification Search
USPC ......... 119/675, 673, 671, 600, 602, 603, 665, 119/668, 669, 676
See application file for complete search history.

(56) References Cited

U.S. PATENT DOCUMENTS

| | | | | |
|---|---|---|---|---|
| 2,611,341 A * | 9/1952 | Paris | ............................ | 119/675 |
| 3,583,368 A * | 6/1971 | Mandelhaum et al. | ........ | 119/603 |
| 4,332,217 A * | 6/1982 | Davis | ............................ | 119/700 |
| 4,379,438 A * | 4/1983 | Peardon | ....................... | 119/702 |
| 4,549,502 A * | 10/1985 | Namdari | ....................... | 119/664 |
| 4,987,619 A * | 1/1991 | Smith | ............................ | 4/612 |
| 5,148,771 A * | 9/1992 | Schuett et al. | ................ | 119/479 |
| 5,738,044 A * | 4/1998 | Gaylinn | ........................ | 119/671 |
| 5,794,570 A * | 8/1998 | Foster et al. | ................... | 119/756 |
| 5,931,174 A * | 8/1999 | Salas et al. | ....................... | 134/89 |
| 8,186,308 B1 * | 5/2012 | Hluben et al. | ................. | 119/676 |
| 2005/0034680 A1 * | 2/2005 | Tunnell | ......................... | 119/675 |

* cited by examiner

*Primary Examiner* — Yvonne Abbott
(74) *Attorney, Agent, or Firm* — Reinhart Boerner Van Deuren P.C.

(57) ABSTRACT

A pet wash tub includes a funnel-type hair-diverter arrangement established at all corners near the drain, to slope from the front and sides of the tub, angled downwardly towards the drain. The tub is located inside a pet wash station, which includes a wash room and an equipment room. Specifically, the tub is located in the wash room that includes a floor with a slope that acts to rinse water spilled onto the floor under an opening under a dividing wall between the wash room and the equipment room. A collection trough is located in the equipment room to collect the water as it drains from the wash room. Further, the equipment room includes a control panel and hose extensions for air and washing water/soap such that a user can activate the various systems depending on preference while washing a pet.

7 Claims, 6 Drawing Sheets

PET WASH TUB

CROSS-REFERENCE TO RELATED PATENT APPLICATIONS

This patent application claims the benefit of U.S. Provisional Patent Application No. 61/518,201, filed May 2, 2011, and U.S. Provisional Patent Application No. 61/518,202, filed May 2, 2011, the entire teachings and disclosure of which are incorporated herein by reference thereto.

FIELD OF THE INVENTION

The present invention relates to a pet wash tub which, while suitable for other uses, is particularly suitable to enable a user to wash his or her pet, and which, may be utilized in other arrangements, is especially suitable for use in a pet wash station.

BACKGROUND OF THE INVENTION

Self-service pet washing facilities are not currently readily available to pet owners. Therefore, washing a pet typically requires the owner to pay the cost of taking the pet to a professional grooming establishment, or putting up with inconveniences of washing the pet at home.

For example, washing a pet, particularly long-hair dogs and cats, can create a significant mess to clean up if done in one's own tub. And keeping a pet contained and out of the dirt until dry can be difficult if washing the pet outside.

Thus, a pet wash station, configured to vend self-service pet wash capability to pet owners would be desirable to address the above described disadvantages and inconveniences typically associated with washing a pet.

Conventional tubs in which pets are washed, including tubs in pet wash stations, can be difficult to clean after use. In particular, it can be difficult to keep a drain open because dog hair accumulates in the drain during use of the tub. The simplest way to clean hair from a pet wash tub is to rinse the hair down the drain, but this causes hair to become trapped in the corners of the tub near the drain, which increases the likelihood of clogging the drain.

Thus, there is a need for a tub suitable for washing a pet that resists accumulation of hair in the corners near the drain, and resists clogging from hair when draining the tub and when cleaning the tub by rinsing the hair in the tub down the drain.

SUMMARY OF THE INVENTION

An objective of the invention is to provide a new and unique pet wash tub with improved drain characteristics that resists accumulation of hair in the corners near the drain, and clogging from hair when draining the tub and when cleaning the tub by rinsing the hair in the tub down the drain.

Another objective of the invention is to provide a unique pet wash station, configured to vend self-service pet wash capability to pet owners, with a new and unique pet wash tub as described above.

Yet another objective of the invention is to achieve the foregoing by providing a pet wash tub with a funnel-type hair-diverter arrangement established the corner(s) near the drain, to slope from position(s) on the front and sides of the tub, as applicable, downwardly towards the drain, in order to prevent hair from accumulating in the corner(s) of the tub and to direct hair immediately into the drain as it drains with water in the tub or is rinsed towards the end of the tub with the drain.

The foregoing objectives are achieved, in one aspect, by an embodiment of a pet washing tub according to the teachings of the present invention. Such an embodiment of a tub includes a floor forming a bottom surface of the tub. A first retaining wall is located at one end of the tub and forms a corner with the floor. A second retaining wall is located at another end of the tub which is opposite the first retaining wall. First and second sidewalls extend from the floor in an opposed-spaced relationship and between the first and second retaining walls. A drain is positioned approximate the corner. The drain defines an opening for collection and routing of refuse from the tub. The first retaining wall includes at least one panel at an angle greater than 90° relative to the floor. The at least one panel converges towards the drain.

In certain embodiments, the at least one panel extends from one of the first and second sidewalls and extends from the floor, and terminates at the opening of the drain. In certain other embodiments, the at least one panel comprises a first and a second panel each at an angle of greater than about 90° relative to the floor, with the drain interposed therebetween.

In certain embodiments, the at least one panel also includes a third panel extending generally perpendicular to the floor. The third panel is interposed between the first and second sidewalls such that the second retaining wall, first and second sidewalls, and third panel geometrically form a generally rectangular solid shape. The first panel forms a corner with each of the floor, the first sidewall, and the third panel. The second panel forms a corner with each of the floor, the second sidewall, and the third panel. The first, second, and third panels form generally a funnel-shape relative to the floor. In certain embodiments, the first, second, and third panels form a generally continuous surface, wherein a portion of said continuous surface is perpendicular to the floor.

In certain embodiments, the third panel is arranged as a backing wall relative to the first and second panels such that the third panel extends to a height relative to the floor that is greater than or equal to a height that the first panel extends to relative to the floor, and a height that the second panel extends to relative to the floor. In certain embodiments, the tub also includes a lanyard attached to the tub for leashing a pet.

In certain embodiments, the second retaining wall is of a decreased height relative to the first retaining wall, the first sidewall, and the second sidewall such that the second retaining wall defines an entry way for a pet to enter the tub. In certain embodiments, the tub is elevated from a ground floor of the pet wash station. A step is located proximate the first retaining wall of the tub and disposed between a ground floor of the pet wash station and the floor of the tub.

In another aspect, the foregoing objectives are achieved by a pet washing station. An embodiment of a pet washing station according to this aspect of the invention includes a wash room and an equipment room separated from the wash room by a common wall. A floor common to both the wash room and the equipment room extends through an opening proximate a bottom of the common wall. A drainage trough is formed in the floor in the equipment room. The drainage trough is operably configured to drain away refuse received therein. A tub configured for washing a pet therein is situated in the wash room and includes a drain in fluid communication with the drainage trough.

In certain embodiments, the pet washing station also includes a wash-water supply hose extending from the equipment room to the wash room through the common wall. The pet washing station also includes an air-supply hose extending from the equipment room to the wash room through the common wall.

In certain embodiments, the tub includes a floor that forms a bottom surface of the tub. A first retaining wall is located at one end of the tub and forms a corner with the floor. A second retaining wall is located at another end of the tub opposite the first retaining wall. First and second sidewalls extend from the floor in an opposed-spaced relationship and between the first and second retaining walls. A drain is proximate the corner and defines an opening for collection and routing of refuse from the tub. The first retaining wall includes at least one panel at an angle greater than 90° relative to the floor. The at least one panel converges towards the drain.

In certain embodiments, at least one of the floor of the tub and the floor of the pet washing station are sloped towards the drainage trough such that they are self-draining In certain embodiments, the pet washing station also includes a vending control unit that allows a user to control a pump that supplies wash water to the wash-water supply hose and a pump that supplies air to the air-supply hose. The vending control unit allows a user to choose between wash-water that is just water or wash-water that is a mixture of soap and water.

These and other objectives and advantages achieved by the invention will become more apparent from the following detailed description when taken in conjunction with the accompanying drawings.

Figure 1:
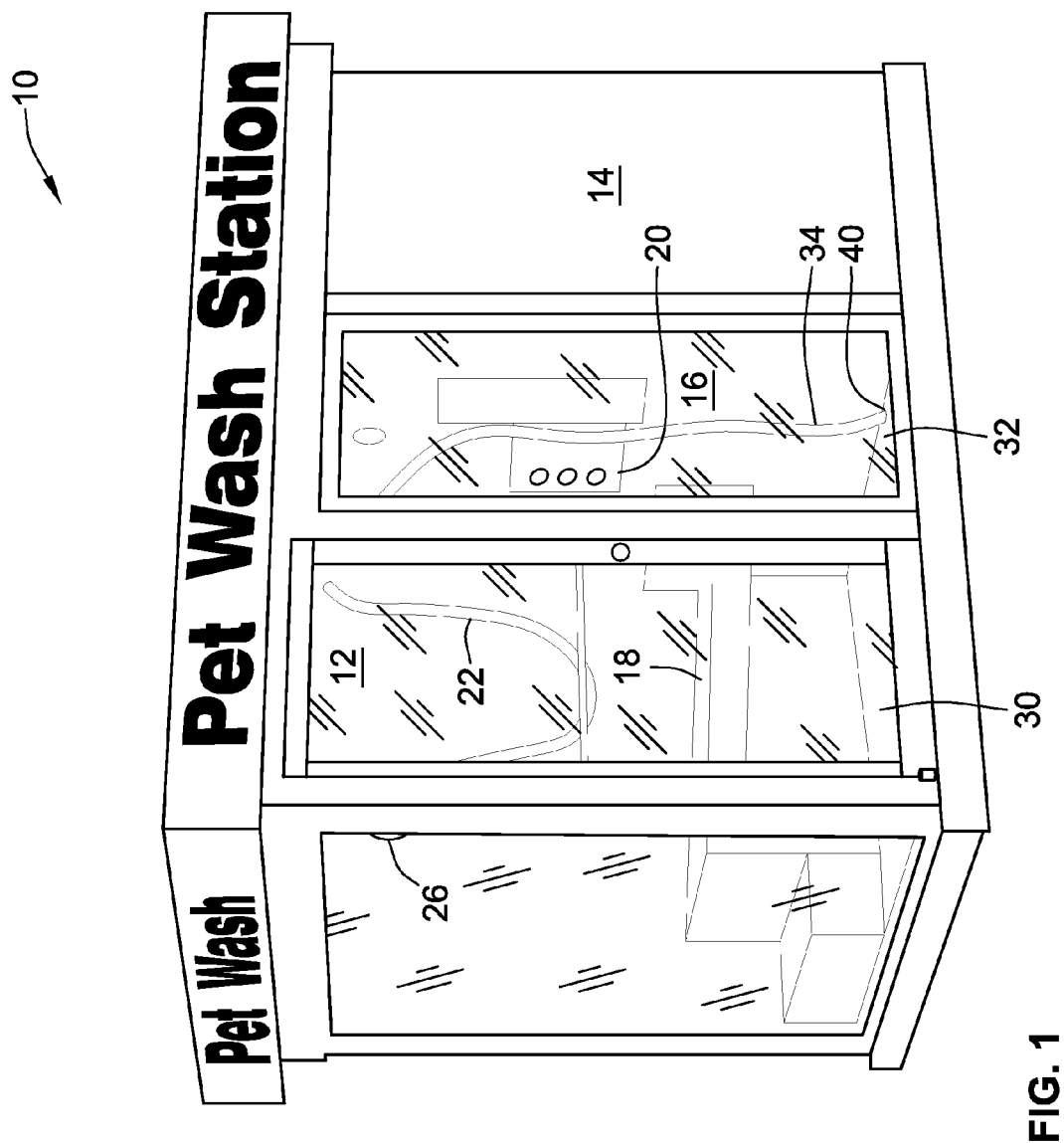
FIG. 1 is a perspective view of a pet wash station equipped with a pet wash tub, in accordance with an embodiment of the present invention.

While the invention is susceptible of various modifications and alternative constructions, a certain embodiment is shown in the drawings and described in detail below. It should be understood, however, that there is no intention to limit the invention to the specific form disclosed, but on the contrary, the intention is to cover all modifications, alternative constructions and methods, and equivalents falling within the spirit and scope of the invention.

DETAILED DESCRIPTION OF THE INVENTION

FIG. 1 illustrates one embodiment of a pet wash station 10 equipped with a wash tub 18 according to the invention. The pet wash station includes a washroom 12 and an equipment room 14. The wash room 12 is configured for and provided with means for manually washing, rinsing and optionally air drying a pet. The equipment room 14 houses operational and support equipment, electrical wiring and controls, electric power, water supply and sewer connections, and anything to which restricted access is to be established. The wash room 12 and equipment room 14 are separated by a common wall 16.

The wash room 12 and equipment room 14 are generally enclosures, each with a floor, a ceiling, surrounding sides, and a doorway, but are connected together to establish a self-contained vending unit that can be shipped as a single unit ready to be set into place and hooked up to site electrical power, water supply and sewer lines.

The wash tub 18 is located in the wash room 12, and is configured to place a pet into for washing. The wash room 12 is further provided with wash-water supply facility to enable manual washing the pet in the tub 18, an optional air drying supply facility, and a vending control unit 20 for controlling availability of the wash water and, if applicable, the drying air in the wash room 12. The wash tub 18 is positioned above the floor 30 of the wash room 12 so that the wash room floor 30 catches water that may splash from the tub 18.

In the embodiment illustrated in FIG. 1, a flexible liquid hose 22 extends from a pressurized wash-water supply unit 24 (See FIG. 2) in the equipment room 14, with the free end of the hose locatable above and proximate to the wash tub 18 for wash and rinse capability of a pet in the tub. A manually operable (e.g., trigger operated) spray head or nozzle 26 may be connected to the free end of the hose 22 for fine user flow control while washing the pet.

Figure 2:
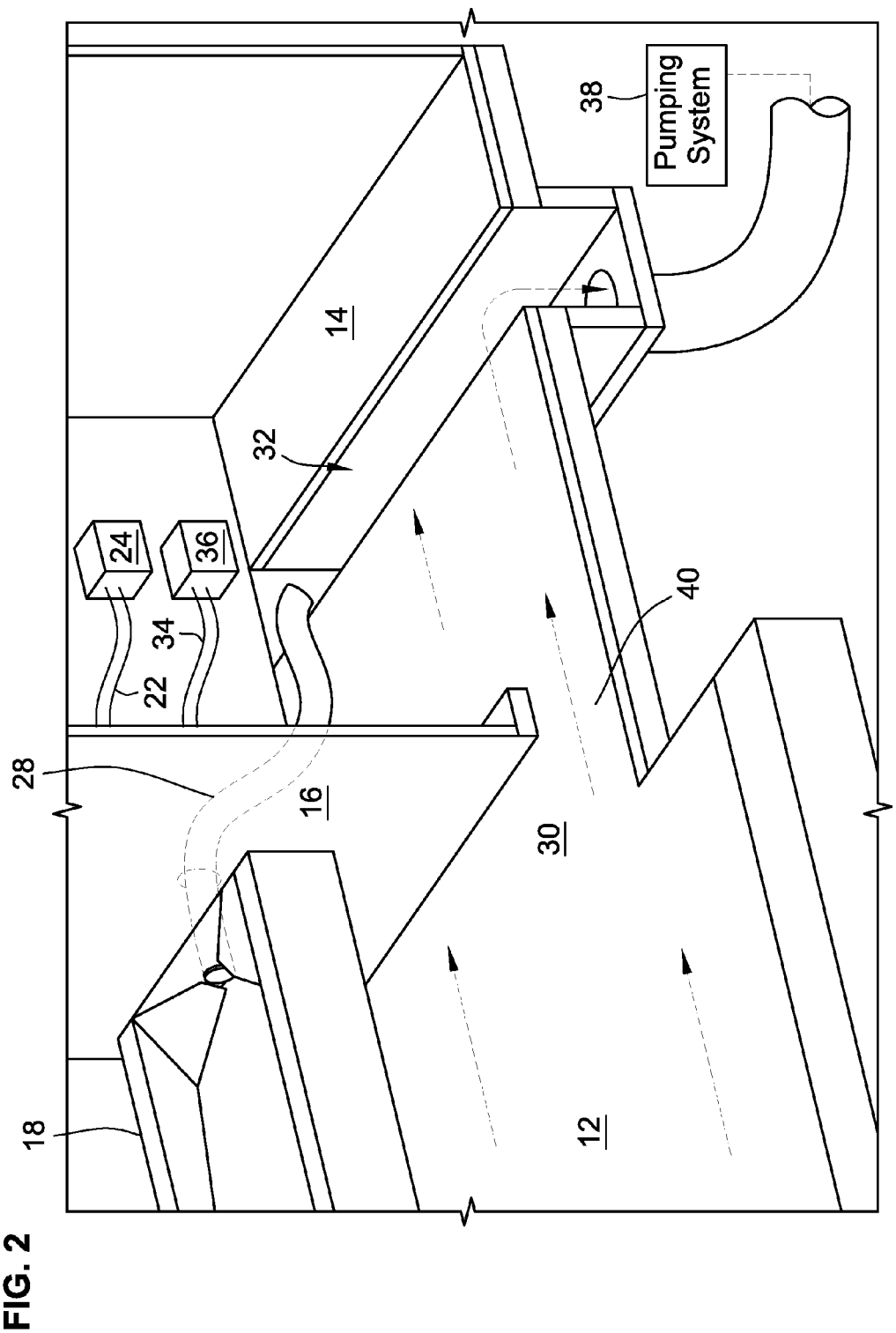
FIG. 2 is an enlarged fragmentary perspective view of certain aspects of the pet wash station shown in FIG. 1, including a diverter arrangement and drain.

Turning now to FIG. 2, the wash-water supply unit 24 may be, for example, a pump, connected to a water supply line to the pet wash station 10 (i.e., an external water source) to supply the user with clean water for both washing and rinsing the pet. The wash-water supply unit 24 may alternately be configured to provide both a washing mixture (e.g., shampoo and water) and clean rinse water, such as an electrically controlled mixing manifold responsive to user selected input at the vending control unit 20.

Figure 4:
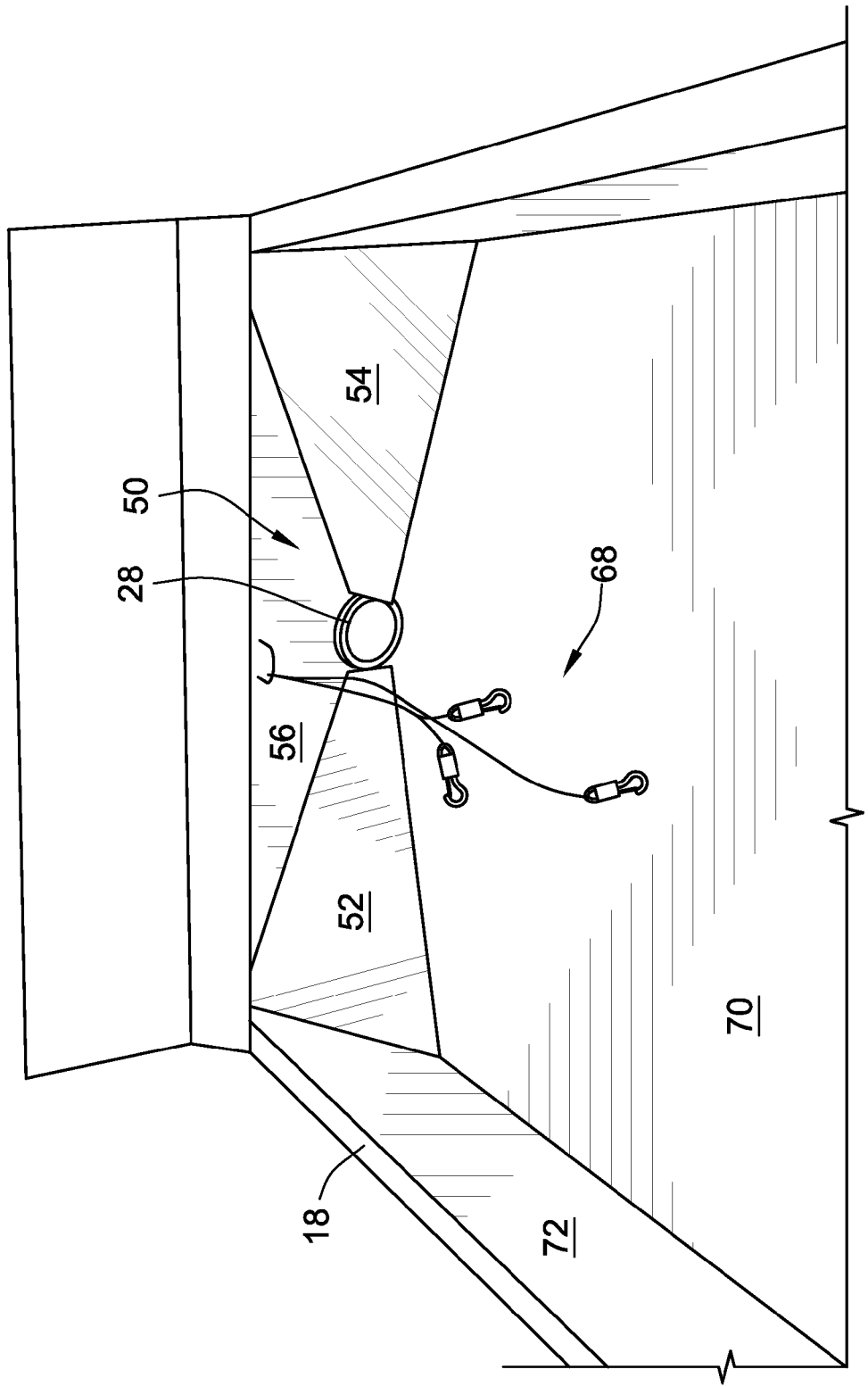
FIG. 4 is an enlarged fragmentary perspective view of certain aspects of the pet wash station shown in FIG. 3.

The wash tub 18 includes a drain 28 (See also FIG. 4) configured to drain cleaning residue (water/soap/dirt) into a collection trough 32 in the floor of the equipment room 14 (See FIG. 4). As illustrated in FIG. 2, the wash room floor 30 slopes down towards and under the common wall 16 to the collection trough such that water on the wash room floor 30 flows (by gravity) through a space 40 between the common wall and the floor 30 to also drain into the collection trough 32. The waste water in the collection trough 32 (from both the wash tub 18 and the wash room floor 30) is pumped through a filter to remove the hair and then into the outside sewer line (not illustrated). As shown schematically, the trough 32, and particularly the drain associated therewith, is in fluid communication with a pumping system 38. The pumping system 38 is sufficiently sized to facilitate the drainage of waste water and refuse which has collected on the wash room floor 30 and/or the tub 18. Those skilled in the art will recognize that the aforementioned grading or sloping of the wash room floor 30 for drainage under gravity need not be incorporated, as the pumping system 38 operates to actively remove a majority of standing waste water, with the remainder being pushed into trough 32 via a squeegee, mop, or the like.

This wash room floor 30 drainage arrangement permits quick and easy floor 30 cleanup with a broom or floor squeegee or spray hose, by simply sweeping, pushing or spraying any water and hair on the floor 30 under the common wall 16 and into the collection trough 32.

The wash room 12 has a wash tub 18 and floor 30 combination that provide two alternate pet wash locations. In particular, the wash room floor 30 is sufficiently larger than the tub 18 (when viewed from above) so that a pet owner has room to wash a pet on the floor 30 rather than in the tub 18. Configuring the wash room floor 30 as an alternate pet washing location is particularly useful for washing larger pets (who may be difficult for the user to lift into the tub 18) and pets who may resist staying in the tub 18, after which, draining of the wash room floor 30 into the collection trough 32 in the equipment room 14, enables the floor 30 to be quickly and easily cleaned by simply sweeping or pushing or spraying the hair and waste water on the floor 30 under the common wall 16 into the equipment room 14.

The optional drying air may be provided through a flexible air hose 34 connected at one end to a blower or other pressurized air supply unit 36 in the equipment room 14, with the other end of this hose available in the wash room 12 (See FIG. 1) to supply pressurized air to dry the pet after washing.

Figure 3:
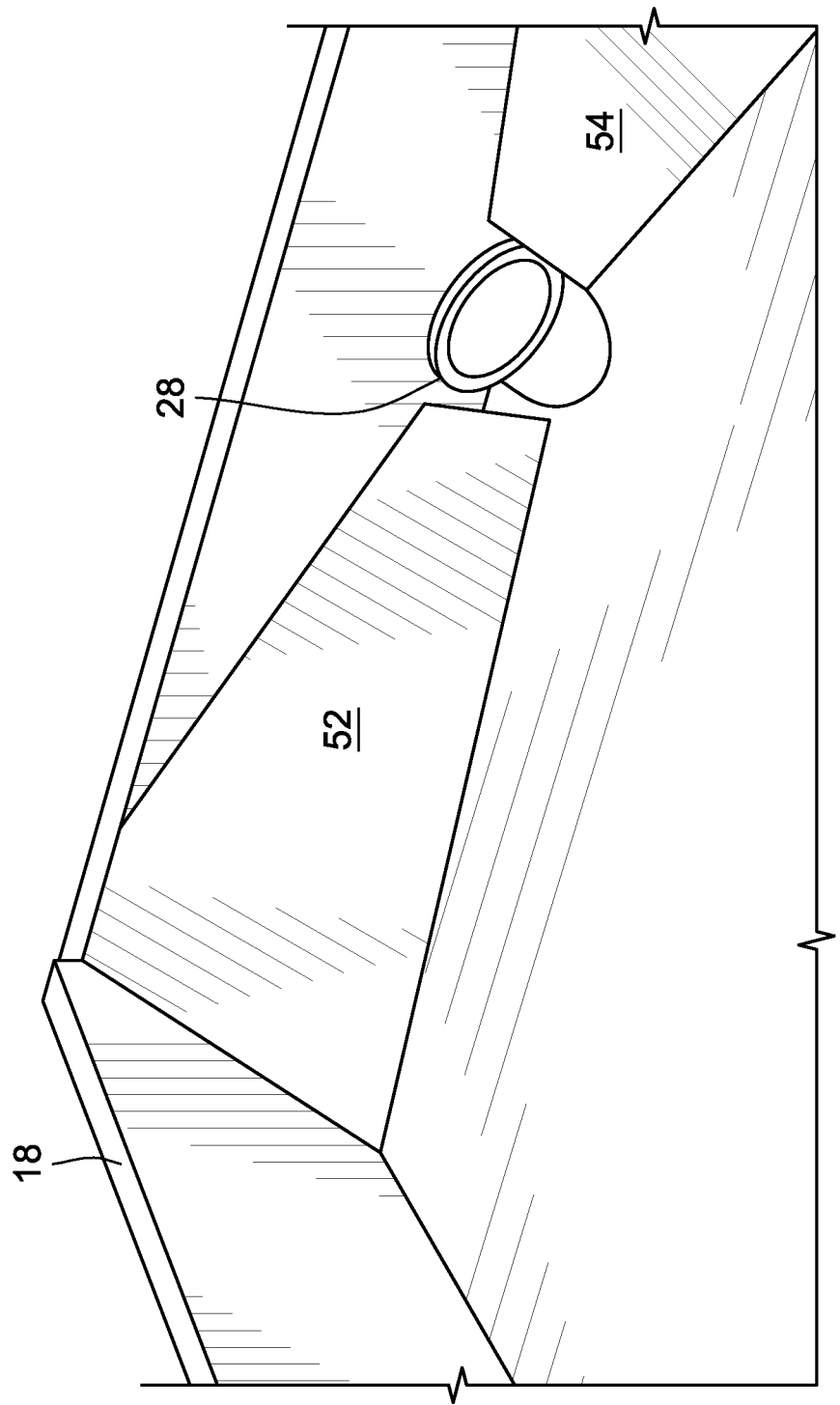
FIG. 3 is an enlarged fragmentary perspective view of certain additional aspects of the pet wash station shown in FIGS. 1 and 2, including a pet wash tub.

Referring now to FIG. 3, the wash tub 18 is illustrated and equipped with the drain 28 located in the center of the front lower corner, and a funnel-type hair-diverter arrangement is established in the two front side corners proximate to the drain 28, to slope from positions on the front and sides of the tub, angled downwardly towards the drain 28, in order to prevent hair from accumulating in the front corners of the tub and to direct hair immediately into the drain 28 as it drains with water in the tub 18 or is rinsed towards the end of the tub 18 with the drain 18.

Turning now to FIG. 4, the tub 18 includes a floor 70, with first and second side walls 72, 74 which extend upwardly therefrom. The tub 18 also includes a first retaining wall 50 at one end of the tub 18 interposed between the first and second sidewalls 72, 74. A second retaining wall 60 (See FIG. 5) is situated at an end of the tub 18 opposite the first retaining wall 50, and also interposed between the first and second sidewalls 72, 74. The first retaining wall is generally funnel shaped, and the drain 28 extends therethrough as illustrated at FIG. 4.

The first retaining wall 50 includes first and second panels 52, 54, which extend at an angle of greater than about ninety degrees relative to the floor 70, at an angle of greater than about ninety degrees relative to the first and second side walls 72, 74 (respectively), and also at an angle of greater than about ninety degrees relative to a third panel 56 positioned behind the first and second panels 52, 54. The first retaining wall 50 is illustrated as joined to the common wall 16 (see FIG. 1). However, in other embodiments, the first retaining wall 50 may be formed integrally with the common wall 16. In a similar manner and in other embodiments, either of the side walls of the tub and/or the second retaining wall 60 can form an integral portion of the walls of the pet wash station 10, as opposed to the stand alone configuration illustrated.

In the illustrated embodiment, the third panel 56, first and second side walls 72, 74, second retaining wall 60 (see FIG. 5), and floor 70 geometrically form a generally rectangular solid. The first and second panels 52, 54 are thereafter joined to the third panel 56 by any mechanical means including but not limited to welding. As a result, the first retaining wall 50 generally takes on a funnel shape when assembled with the first, second, and third panels 52, 54, 56, with the third panel 56 functioning as a backing wall or support wall for the first and second panels 52, 54. Those skilled in the art will additionally recognize that the first retaining wall 50 could be manufactured as a single, continuous piece such as by way of a sheet metal stamping or other similar metal working processes to form the first, second, and third panels 52, 54, 56, and thereafter joined to a remainder of the tub 18. Yet further, the tub 18 could be manufactured as a single molded component from any suitable material used in such processes.

In view of the above, it will be recognized that the funnel-type arrangement of tub 18 directs water at an angle into the drain 28. The first retaining wall 50 generally defines a continuous surface formed by the first panel, the exposed portion of the third panel 56, and the second panel 54. A portion of this continuous surface, indeed the exposed portion of the third panel 56, is generally perpendicular to the floor 70. Without the use of the aforementioned described configuration of a front retaining wall 50, hair will otherwise accumulate at the ninety degree corners of a conventional tub. Although illustrated with the drain 28 generally centrally located along the front lower corner of the tub 18, other drain locations are contemplated as described below. In the event of alternate drain 28 locations, tub 18 will nevertheless incorporate angled panels which will operate to funnel waste water and refuse towards the drain and away from corners of the tub 18.

Also as shown in FIG. 4, the tub 18 can also be equipped with collar lanyards 64 for leashing a pet to the tub 18. These lanyards can be affixed to a metal ring that is in turn affixed to the tub.

The pet wash tub 18 is constructed from stainless steel material, with stainless steel panels 52, 54 welded into position in the illustrated embodiment. As indicated above, the first retaining wall 50 may be manufactured from other materials, and via other processes such as for example stamping. Also as indicated above, the entire tub can be manufactured via other processes such as for example molding, etc.

In a wash tub 18 with the drain 28 located in an alternate location, such as in the right most or left most bottom corner masked by the first and second panels 52, 54 in FIG. 4, hair-diverter is configured generally described above, but would only use the third panel 56, and one of panels 52, 54 in an elongated form so that it would extend from either the first side wall 72 to the drain 28, or the second side wall 74 to the drain 28. Further, although illustrated in FIGS. 3 and 4 as passing through the third panel 56 of the first retaining wall 50, drain 28 can instead be positioned at the corner between the first retaining wall 50 and floor 70 by extending through the floor 70.

Figure 5:
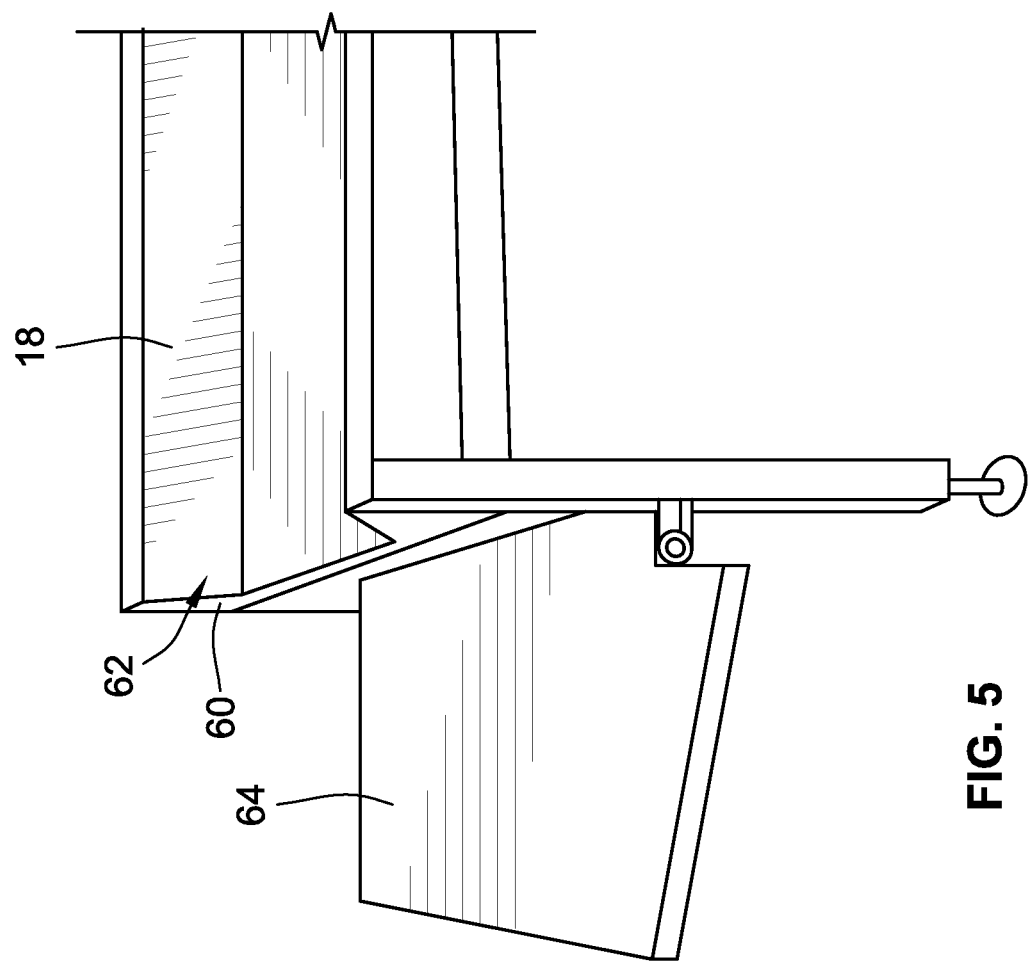
FIG. 5 is an enlarged fragmentary perspective view of the pet wash tub shown in FIGS. 1-4.

As illustrated in FIG. 5, the pet wash tub 18 is also equipped with a step 64 proximate the second retaining wall 60. The second retaining wall 60 has a reduced height 62 that defines an entry way for a pet to enter the tub 18. Legs extend downwardly and support the tub 18 at the second retaining wall 60. However, in other embodiments, the legs may be omitted entirely such that the tub 18 extends in a cantilevered fashion from common wall 16.

Figure 6:
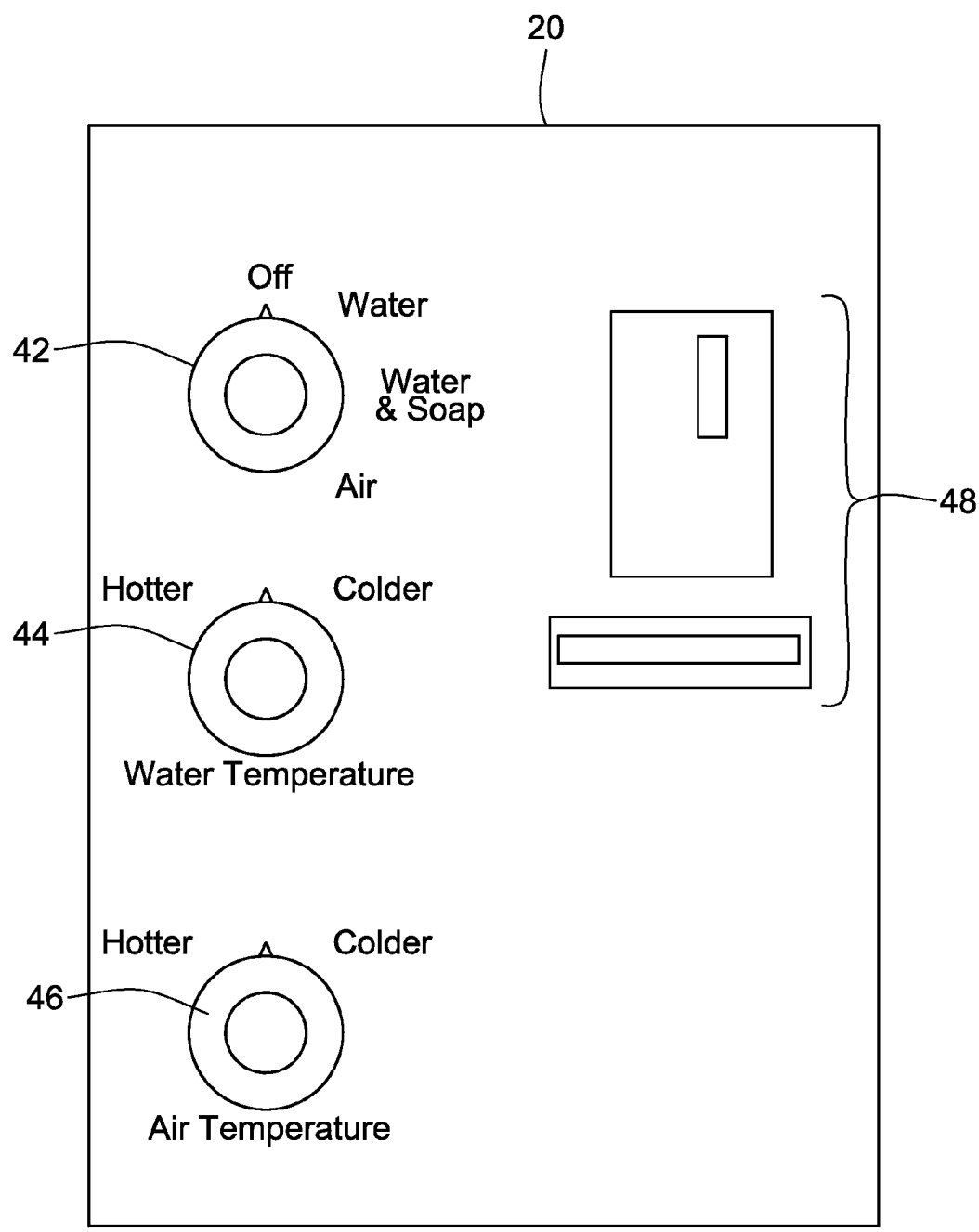
FIG. 6 is a front view of a control unit of the pet wash station of FIG. 1.

As shown in FIG. 6, the vending control unit 20 (See FIG. 1) controls the availability of washing liquid and drying air (if applicable) responsive to user selected input. In particular, in a convention arrangement for self-service wash facilities, the vending control unit 20 accepts wash-cycle selection made by the user (e.g., by selection of option(s) with one or more control knobs 42, 44, 46), and responsive thereto controls the wash-water and air supply units, 24 and 36 respectively (See FIG. 2), in the equipment room 14, thus controlling the supply availability and length of time of the washing and rinsing fluid to the spray nozzle 26, and if applicable, the control of the air to the drying hose 32. The vending control unit accepts payment from the user in any convenient form (e.g., coins, paper, tokens, debit or credit cards, etc.) to activate its operational control functions.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A pet washing station comprising:
   a wash room;
   an equipment room separated from the wash room by a common wall;
   a floor common to both the wash room and the equipment room, the floor extending through an opening proximate a bottom of the common wall;
   a drainage trough formed in the floor in the equipment room, the drainage trough operably configured to drain away refuse received therein;
   a tub configured for washing a pet therein, the tub situated in the wash room and including a drain in fluid communication with the drainage trough.

2. The pet washing station of claim 1, further comprising a wash-water supply hose extending from the equipment room to the washroom through the common wall.

3. The pet washing station of claim 2, further comprising an air-supply hose extending from the equipment room to the washroom through the common wall.

4. The pet washing station of claim 3, further comprising a vending control unit that allows a user to control a pump that supplies wash water to the wash-water supply hose and a pump that supplies air to the air-supply hose.

5. The pet washing station of claim 4, wherein the vending control unit allows the user to choose between wash-water that is just water or wash-water that is a mixture of soap and water.

6. The pet washing station of claim 1, wherein the tub comprises:
   a floor forming a bottom surface of the tub;
   a first retaining wall located at one end of the tub and forming a corner with the floor;
   a second retaining wall located at another end of the tub, opposite the first retaining wall;
   first and second side walls extending from the floor in an opposed spaced relationship and between the first and second retaining walls;
   a drain proximate the corner, the drain defining an opening for collection and routing of refuse from the tub; and
   wherein the first retaining wall includes at least one panel at an angle greater than ninety degrees relative to the floor, the at least one panel converging towards the drain.

7. The pet washing station of claim 6, wherein at least one of the floor of the tub and the floor of the pet washing station are sloped towards the drainage trough such that they are self-draining.

* * * * *